United States Patent
Yadav (10) Patent No.: US 7,720,006 B1
(45) Date of Patent: May 18, 2010

(54) SYSTEM FOR DETERMINING REACHABLITY OF A NEIGHBORING NODE IN A NETWORK

(75) Inventor: Navindra Yadav, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1342 days.

(21) Appl. No.: 10/636,347

(22) Filed: Aug. 6, 2003

(51) Int. Cl.
*H04L 12/28* (2006.01)
*H04L 12/56* (2006.01)

(52) U.S. Cl. .................................. 370/255; 370/432
(58) Field of Classification Search ............... 370/400, 370/254, 255, 238, 392, 449, 432
See application file for complete search history.

(56) References Cited

U.S. PATENT DOCUMENTS

| | | | | |
|---|---|---|---|---|
| 5,115,433 A | * | 5/1992 | Baran et al. ................. | 370/400 |
| 5,488,608 A | * | 1/1996 | Flammer, III ............... | 370/400 |
| 5,917,820 A | * | 6/1999 | Rekhter ...................... | 370/392 |
| 5,964,837 A | * | 10/1999 | Chao et al. .................. | 709/224 |
| 2002/0143989 A1 | * | 10/2002 | Huitema et al. ............. | 709/243 |

* cited by examiner

*Primary Examiner*—Seema S Rao
*Assistant Examiner*—Mon Cheri S Davenport
(74) *Attorney, Agent, or Firm*—Weaver Austin Villeneuve & Sampson LLP (57) ABSTRACT

A system for determining reachablity of a neighboring node from a node. A packet is received over a network by node. The packet has a destination address of a node other than the receiving node. The node reads a source address from the packet. The node then determines whether the source address is for a neighboring node in which the node has an interest. The node then determines whether the packet indicates a forward link from the node to the neighboring node. Reachablity information for the neighboring node is then stored in a memory responsive to a determination of the forward link.

78 Claims, 10 Drawing Sheets

SYSTEM FOR DETERMINING REACHABLITY OF A NEIGHBORING NODE IN A NETWORK

FIELD OF THE INVENTION

This invention relates to processing connected via a communications network. More particularly, this invention relates to a system for a node on the network for determining reachablity of a neighboring node for packets transmitted by the node. Still more particularly, this invention relates to a system for providing reachablity information about neighboring nodes using hints based upon packets passing through the node.

PRIOR ART

In recent years, the amount of devices that connect to the Internet has increased exponentially. Furthermore, the advancement in wireless technology has made it possible for devices to move and change connection points to the Internet. In order to cope with the rapid increase of devices connected to the Internet and the mobility of devices, a new standard for Internet communication, known as IP version 6 (IPv6), has been developed.

Among the advantages of IPv6 is a new 128 bit-addressing scheme. This addressing scheme increases the number of available addresses. In the conventional IPv4 addressing scheme, 32-bit addresses are used. By increasing the address length to 128 bits, IPv6 provides at least 4 times the amount of addresses available. A second advantage of IPv6 is that IPv6 provides a method for nodes to determine which devices are connected to the node. For purposes of this discussion, a node is a processing system, such as a server, router, or computer, connected to a network. Also for purposes of this discussion, a neighbor is a node that is directly connected to another node over the network. In IPv6, nodes periodically determine reachablity of a neighboring node. Reachablity means that there is a forward path for transmitting packets from a node to a neighboring node. Reachablity may be determined by a node transmitting a neighbor solicitation message to a neighboring node and receiving a response from a neighboring node. The response message indicates the solicitation message was received and that there is a forward path from the node to the neighboring node.

In order to reduce processing time and traffic across a network, a node may use "hints" from other transmission layers to determine whether a node is reachable. However, these "hints" are not always available to a node for use in determining reachablity. Therefore, the node must rely on solicitation message to determine reachablity.

It is a problem that many processing systems in a network may not have the capability to handle the message traffic required to determine reachablity of neighboring nodes. Some processing systems may not have a processor capable of performing the functions necessary to transmit and receive the numerous messages required to determine reachablity of neighboring nodes. For example, in a conventional system, solicitation messages must be generated every ten seconds to determine reachablity of the neighboring nodes. Thus, a processing system is constantly transmitting solicitation messages to the neighboring nodes. Furthermore, the use of solicitation messages greatly increase the amount of messages transmitted over the network.

The amount of messages is particularly troublesome to existing devices that were designed for older versions, such as IP version 4, that did not anticipate the increase in amount of messages transmitted in IPv6. Thus, there is a need in art for a system that can determine reachablity of a neighboring node without increasing the amount of messages transmitted between nodes.

SUMMARY OF THE INVENTION

The above and other problems are solved and an advance art is made by a system for determining reachablity of a neighboring node in accordance with this invention. In accordance with this invention, "hints" about reachablity of a neighboring node are detected from packets received by a node during transmission of packets over the network. A first advantage of this invention is that a node does not have to actively transmit as many solicitation packets to resolve reachablity of neighboring node, thus the processing required to determine reachablity is reduced. A second advantage is that the amount of traffic over the network is reduced, as not as many solicitation and response messages must be sent over the network.

In accordance with an embodiment of this invention, a node reads packets received by the node to determine if the packet indicates a forward connection to a neighboring node. The source address of a received packet is used to determine whether the packet is from a neighboring node. If the packet is from a neighboring node, the node determines whether the packet indicates a forward path from the node to the neighboring node for transmitting packets. If the packet does indicate a forward path, a memory indicating the forward path is updated. Software that provides IPv6 then periodically reads the memory to update a reachablity database.

In accordance with an exemplary embodiment of this invention, one manner of determining whether a packet indicates a forward link is to determine whether the packet includes an advertisement. The determination of whether a packet includes an advertisement is to read a solicitation bit from the packet and determine whether the solicitation bit is set. If the solicitation bit is set, the source address of the packet is stored to a neighbor cache in a memory.

In accordance with another exemplary embodiment of this invention, an interest table is maintained. The interest table stores source addresses of neighboring nodes for which the nodes requires reachablity information. In this embodiment, the source address of a received packet is read and the interest table is searched for the source address. If the source address is stored in the interest table, reachablity information for the source address is stored in the interest table. The reachablity information may include a destination address from the packet, a source port for the packet, a destination port for the packet, an acknowledgement number, and sequence numbers from the packet. When the interest table is full, an interrupt may be generated for a software program. The software program then reads the interest table and updates a reachablity database. The reading of the interest table may periodically be performed by the software, thus an interrupt is not needed. The software also inserts addresses of neighboring nodes into the interest table when the reachablity information for the neighboring node is stale.

In accordance with another exemplary embodiment of this invention, an interest table is used in the following manner. When a packet is received, the source address is read from the packet. A look up is then performed in the interest table for the source address. If the source address is in the interest table, a reverse path forward look-up is performed. The reverse path forward look up is made for packets if the previous hop for the packet was a router of "interest." The results of the reverse path forward look up are then stored in the interest table with the source address. The interest table is then read as described above.

In accordance with another exemplary embodiment of this invention, the following process is performed to determine reachablity of neighboring nodes. As packets are received, packets are periodically written to a queue. A processor then reads a packet from the queue. The source address is then read from the packet and a reverse path forward look up is performed. A reachablity database is then updated with the results of the look-up.

BRIEF DESCRIPTION OF THE DRAWINGS

The above and other features of this invention are described in the following description and the following drawings.

DETAILED DESCRIPTION

The following description of exemplary embodiments of the invention is not intended to limit the scope of the invention to these exemplary embodiments, but rather to enable any person skilled in the art to make and use the invention.

This invention relates to processes, executed by a node, for determining reachablity of a neighboring node. In accordance with this invention, a node receives packets being transmitted from a neighboring node and uses the packets to determine the reachablity of neighboring nodes. This reduces the need for solicitation and advertisement messages being transmitted between a node and neighboring nodes.

Figure 1:
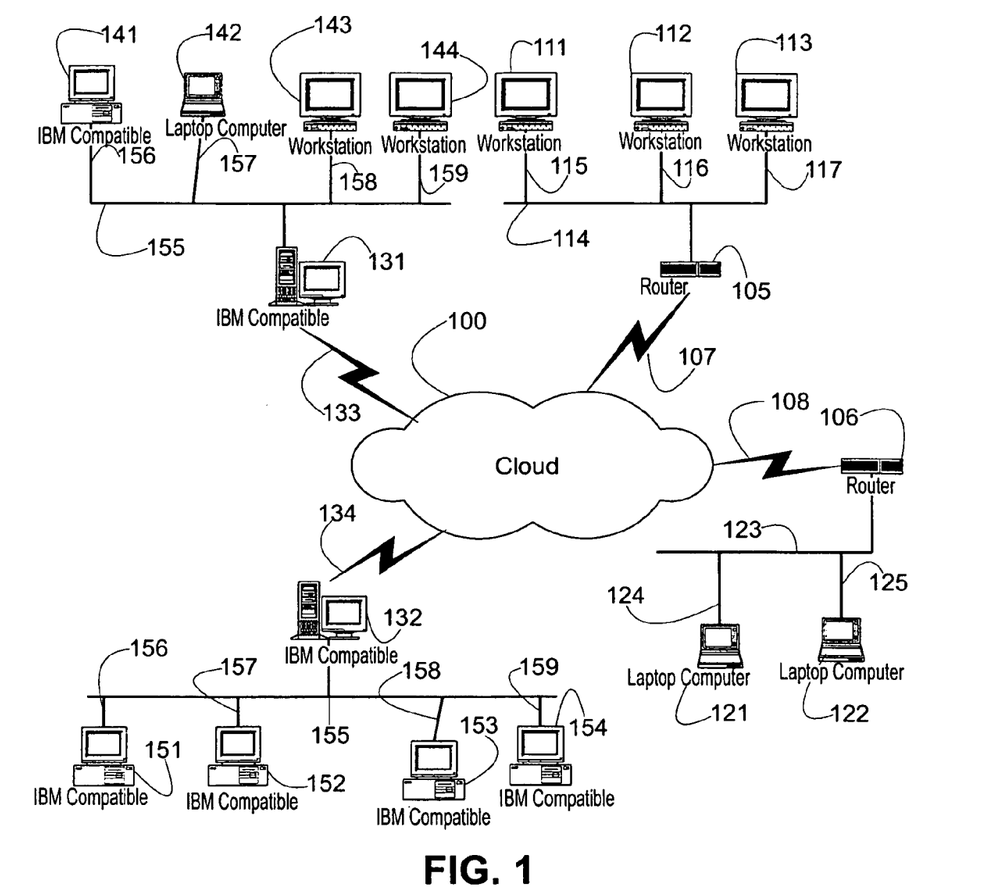
FIG. 1 illustrating a network including processing systems that perform processes in accordance with this invention.

FIG. 1 illustrates a network 100 that includes processing devices that execute processes for determining reachablity in accordance with this invention. Network 100 is the Internet, a Local Area Network (LAN), a Wide Area Network (WAN) or other communications network that allows processing systems to transmit data between one another.

Routers are conventional routers for transmitting data between processing systems connected to the routers and other processing systems in network 100. Routers 105-106 are connected to network 100 via path 107-108. Paths 107-108 are communication links between the router and network 100 such as a T1 telecommunications line. However, the exact communication link is unimportant with respect to the present invention and a discussion of the communication links is omitted for brevity.

In FIG. 1, router 105 is connected to workstations 111-113 via paths 114-117. Desktop computer systems 111-113 are computer systems that via connected to a local network to router 105 in order to transmit data to other processing systems in network 100. Router 106 is connected to laptop computers 121-122 via paths 123-125. Laptop computers 121-122 are portable computer systems that connect to router 106 via a local network to transmit data to other processing systems in network 100. One skilled in the art will recognize that each of the routers are shown connected to one type of computer system. However, any combinations of types of computer or processing systems may be connected to either of the routers 105-106. The exact type of systems connected to the routers 105-106 are not important to this invention. One skilled in the art will also recognize that path 114-117 and 123-125 may be conventional connections via a co-axial cable or other wiring. Alternatively, the paths may be Radio Frequency (RF) or other type of wireless connection.

Server computers 131 and 132 are connected to network 100 via paths 133-134. Server computers 131 and 132 are computer systems that communicate which interact with other processing systems to transfer data. A server may also allow connected processing systems communicate with other processing systems in network 100.

Server 131 is connected to computers systems 141-144 via paths 145-149. Computer systems 141-144 may be any type of computer system including but not limited to a desktop computer, a laptop computer, or a workstation. Path 145-149 may be a conventional wire connection using co-axial cable or other wiring or may be a wireless connection. The exact configuration of paths is unimportant for purposes of this invention.

Server 132 is connected to computers systems 151-154 via paths 155-159. Computer systems 151-154 may be any type of computer system including but not limited to a desktop computer, a laptop computer, or a workstation. Path 155-159 may be a conventional wire connection using co-axial cable or other wiring or may be a wireless connection. The exact configuration of paths is unimportant for purposes of this invention. One skilled in the art will also recognize that routers 105-106 and servers 131-132 may be routers, servers, switches, or any other system used to route data transmitted over the network to connected devices.

Figure 2:
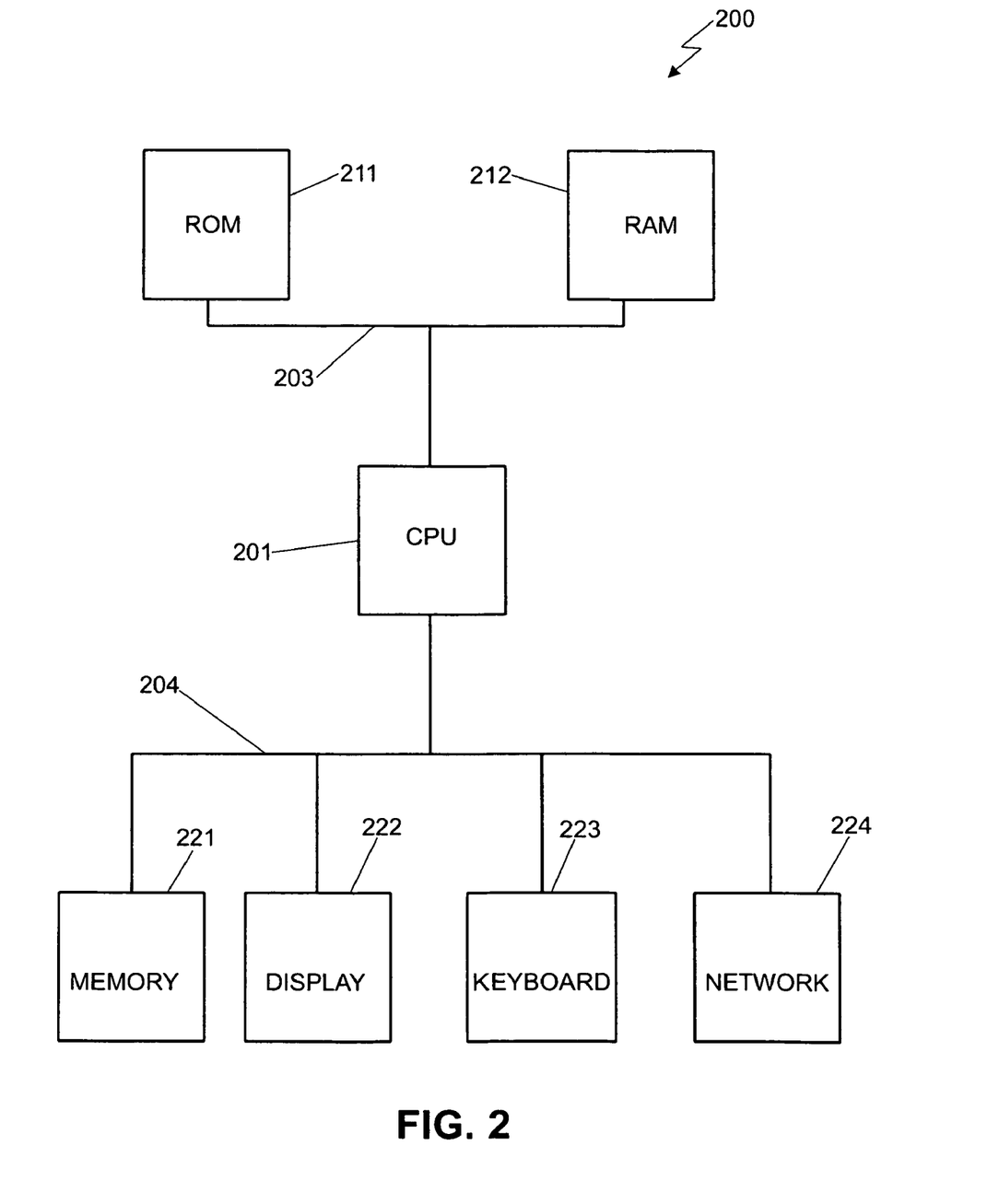
FIG. 2 illustrating a block diagram of components of a processing system.

FIG. 2 illustrates an exemplary embodiment of a processing system 200. One skilled in the art will recognize that each device connected to network 100 in FIG. 1 includes a processing system 200. However, the exact configuration and devices connected to the processing system in each individual device in the network may vary depending upon the functions that the processing device performs.

Processing system 200 has a Central Processing Unit (CPU) 201. CPU 201 is a processor, microprocessor, or any combination of processors and/or microprocessors that execute instructions stored in memory to perform an application. CPU 201 is connected to a memory bus 203 and Input/Output (I/O) bus 204.

A non-volatile memory such as Read Only Memory (ROM) 211 is connected to CPU 201 via memory bus 203. ROM 211 stores instructions for initialization and other systems command of processing system 200. One skilled in the art will recognize that any memory that cannot be written to by CPU 201 may be used for the functions of ROM 211.

A volatile memory such as Random Access Memory (RAM) 212 is also connected to CPU 201 via memory bus 204. RAM 212 stores instructions for all processes being executed and data operated upon by the executed processes. One skilled in the art will recognize that other types of memories such as DRAM and SRAM may also be used as a volatile memory and that memory caches and other memory devices (not shown) may be connected to memory bus 204.

Peripheral devices including, but not limited to, memory 221, display 222, I/O device 223, and network connection device 224 that are connected to CPU 201 via I/O bus 204. I/O bus 204 carries data between the device and CPU 201. Memory 201 is a device for storing data unto a media. Some examples of memory 221 include read/write compact discs (CDs), and magnetic disk drives. Display 222 is a monitor or display and associated drivers that convert data to a display. I/O device 223 is a keyboard, a pointing device or other device that may be used by a user to input data. Network device 224 is a modem or Ethernet "card" that connects processing system 200 to a network. One skilled in the art will recognize that exact configuration and devices connected to each processing system in network 100 may vary depending upon the operations that the processing system performs in the network.

Figure 3:
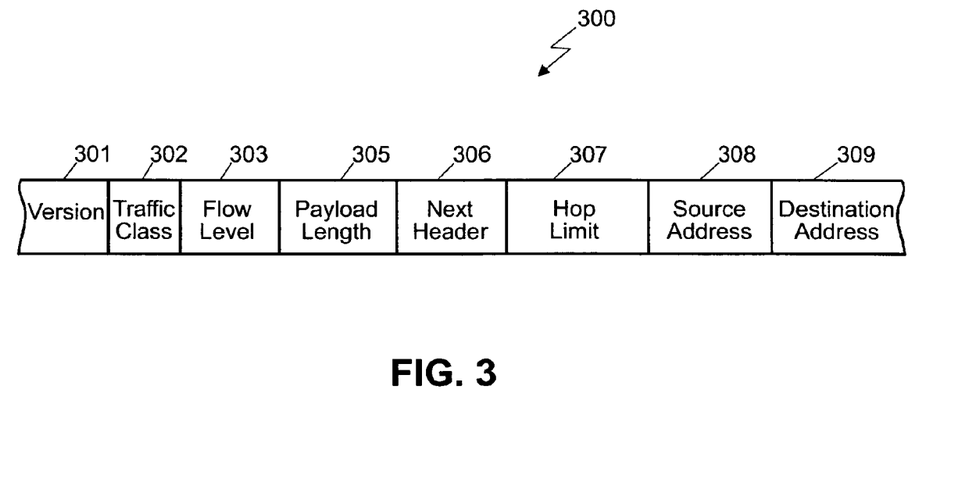
FIG. 3 illustrating a block diagram of a IPv6 packet.

In a network, data is transmitted between a processing device in packets. IPv6 provides a new format for the data in a packet transmitted across the network. This invention uses packets sent from a neighboring node to determine reachablity of the neighboring node from a node. FIG. 3 illustrates the format of a packet in IPv6. Packet 300 includes version field 301, traffic class field 302, flow label field 303, payload length field 305, next header field 306, hop limit field 307, source address field 308, and destination address field 309 in a header.

Version field 301 is a 4-bit field that indicates the IP version of the packet format. In IPv6, this is indicated by a six or 0110 in binary. Traffic class field 302 is an 8-bit field that is similar to the type of service field in IP version 4. Flow label field 303 is a 20-bit field that can be used to tag packets for a specific flow to differentiate the packets at the network layer. Thus, flow label field 303 enables identification of a flow and per flow processing by the routers in a path between a source node and a destination node.

Payload length field 305 is a field that indicates a total length in bits of a data or payload portion of a packet. Next header field 306 indicates the type of information following the header. In packet 300, next header field 306 indicates that an extension header for Internet Control Message Protocol (ICMP) follows. One skilled in the art will recognize that the next header may be one of several types of headers in IPv6 and ICMP headers are the headers used to determine reachablity of a neighboring node. Hop limit field 307 indicates the maximum number of routers that packet 300 may pass through before becoming invalid. Source address field 308 is a 128-bit field that gives the IP address of the node transmitting packet 300. Destination address field 309 is a 128-bit field that gives the address of the node that is to receive packet 300.

Packet 300 also includes an ICMP header that includes a next header field, which indicates the next type of header, if any in the packet. A type field and a code field are used to indicate specific details of packet 300 including the type of message being sent in packet 300. A checksum field is derived from the ICMP header and the IPv6 header to provide a method to test the accuracy of transmitted data. One skilled in the art will notice that although the fields are given in a specific format required by IPv6, this invention may be applied to other protocol or versions of protocols that may have different data formats.

This invention provides hints of reachablity of a neighboring node to a node. These hints are used to determine reachablity. This reduces the amount of neighbor solicitations and advertisement messages that must be transmitted between nodes. The following flow diagrams of process illustrate processes used to determine reachablity of a neighboring node. One skilled in the art will recognize that this invention may be implemented in hardware, firmware, software, or any combination of the preceding three components of a processing system.

Figure 4:
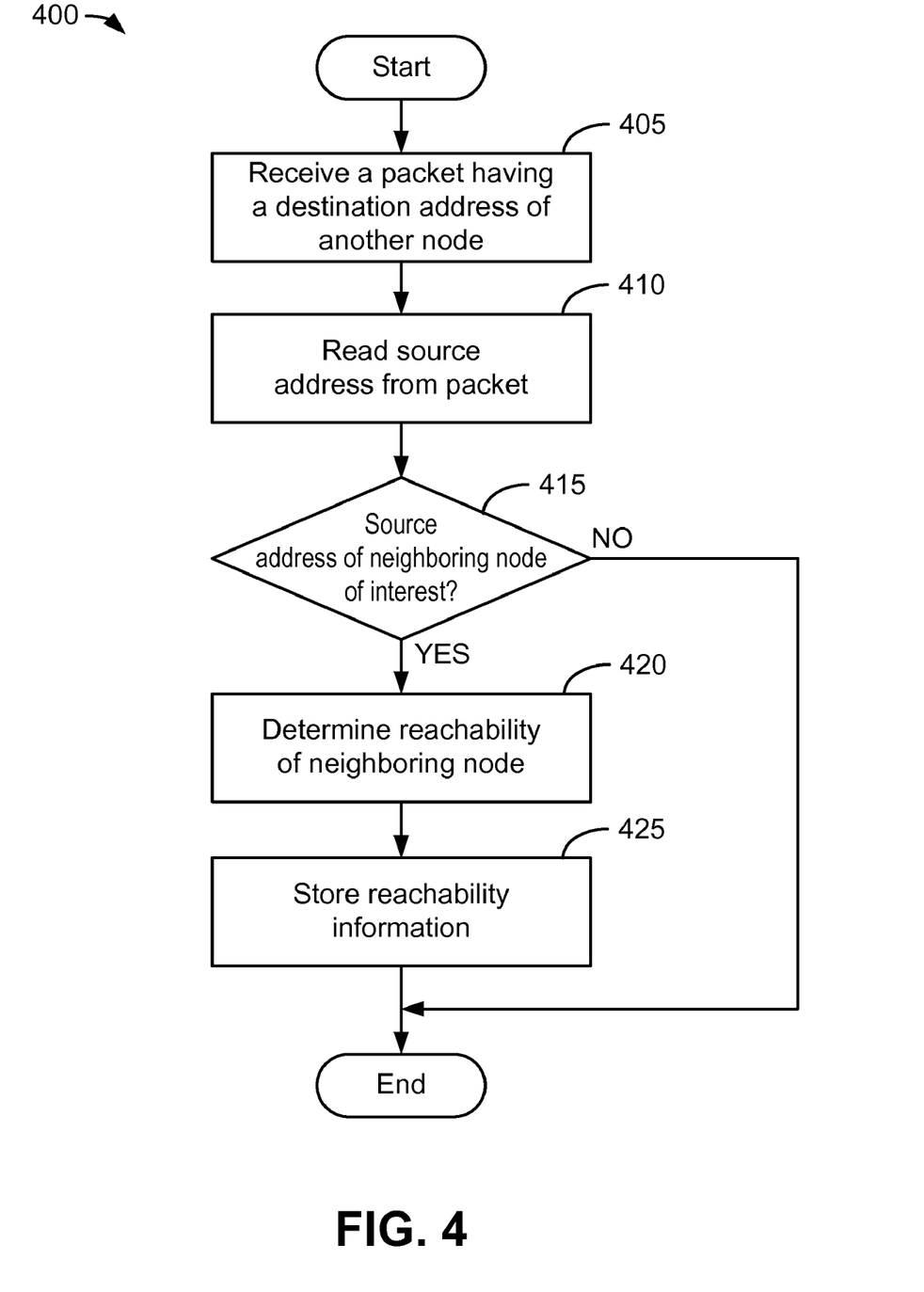
FIG. 4 illustrating a flow diagram of a process for determining reachablity of a neighboring node from a received packet in accordance with this invention.

FIG. 4 illustrates a flow diagram of an embodiment of a process 400 for determining reachablity of a neighboring node from packets received by the node. Process 400 begins in step 405 when a packet is received. The source address of the packet is read in step 410. In step 415, process 400 determines whether the source address is an address of a neighboring node for which a node needs to determine reachablity. This may be done by searching an interest table stored in memory, a database, or some other data structure maintained in memory to indicate source addresses of memory nodes. This step will be described in the following exemplary embodiments.

If the source address of the packet is not from a neighboring node of interest, process 400 ends. If the source address of the packet is from a neighboring node of interest, process 400 determines reachablity information for the neighboring node in step 420. The reachablity information may be read from the packet or other processes may be performed on information read from the packet to determine the information. The reachablity information for the source address is then stored in step 425 and process 400 ends. The following exemplary embodiments describe various methods that may be used to determine the reachablity information. The reachablity information is then stored for use in updating a reachablity module of the IPv6 software applications.

Figure 5:
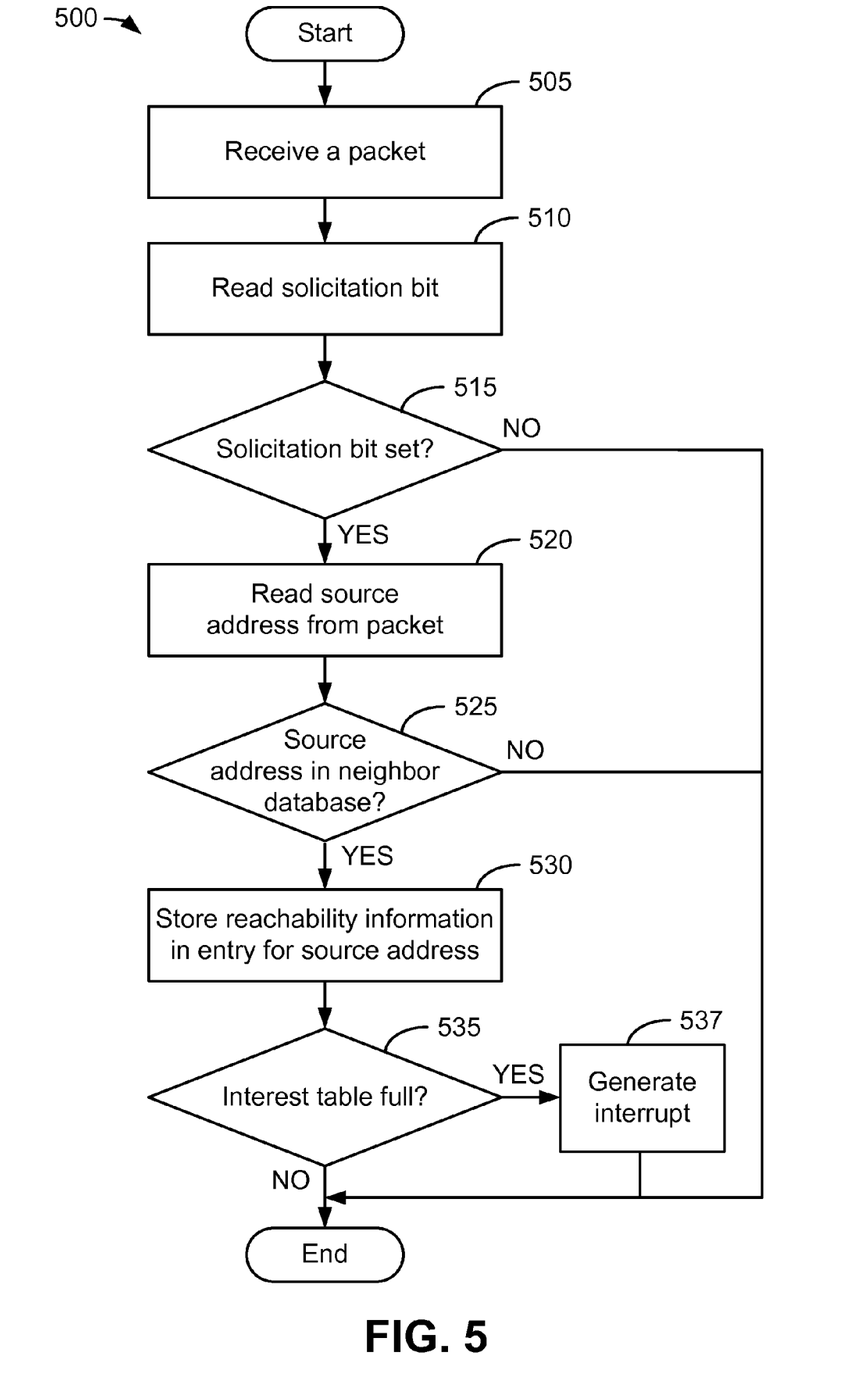
FIG. 5 illustrating a flow diagram of a first exemplary embodiment of a process for determining reachablity of a neighboring node in accordance with an invention.

FIG. 5 illustrates a process 500 for a first exemplary embodiment of this invention. Process 500 begins in step 505 by receiving a packet. In step 510, process 500 reads the extended header of the packet to determine whether the packet is a solicitation advertisement message. Process 500 then determines whether the read extended header indicates a solicitation advertisement in step 515. If the packet is a solicitation advertisement message, process 500 can determine that a forward link exists from the node to the neighboring node that transmitted the message. If the packet is a solicitation advertisement message, process 500 reads the source address of the packet in step 520. Otherwise, process 500 ends.

In step 525, an interest table is read to determine whether the source address read form the packet is contained in the interest table. One skilled in the art will recognize that the interest table may be table database or any other kind of data structure stored in a memory to store source addresses of neighboring nodes for which a node has an interest in determining the reachablity of the node. The interest table may be maintained by software that maintains a neighboring nodes table management database for the IPv6 software.

If the source address is in the interest table, reachablity information for the node of the source address is stored in a neighbor cache or as part of the source address entry in the interest table in step 530. The reachablity information may include but is not limited to the source address, destination address, source port, acknowledgement, and sequence number of the packet.

Process 500 then determines whether the interest table or cache is full in step 535. If the interest table or cache is not full, process 500 ends. If the interest table is full, process 500 generates an interrupt for the IPv6 software in step 537. The IPv6 software then reads the entries of the entry table and updates the neighboring nodes table management database with the read information. The process for the IPv6 software reading from the interest table is described below.

Figure 6:
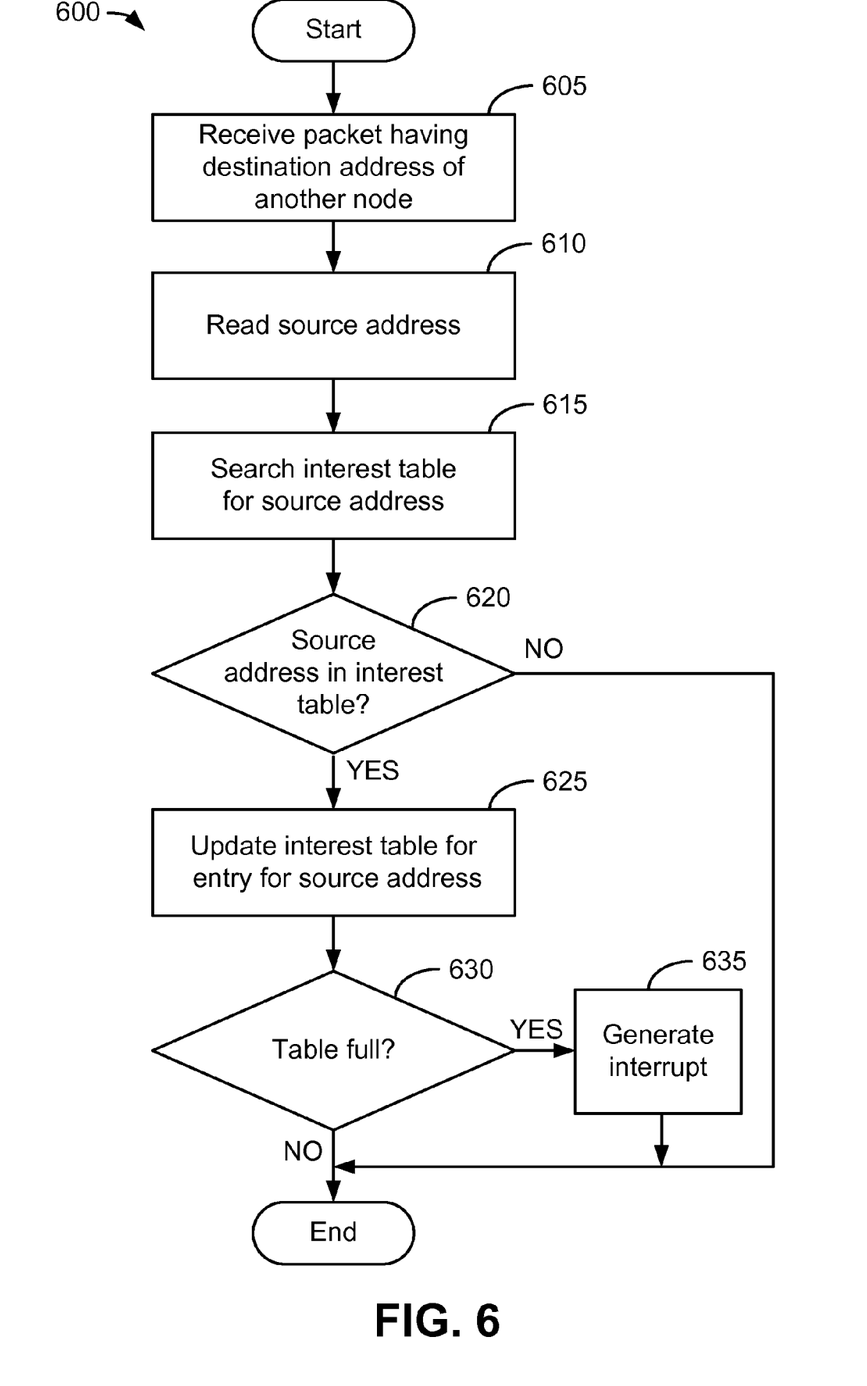
FIG. 6 illustrating a flow diagram of a second exemplary embodiment for determining reachablity of neighboring node in accordance with this invention.

FIG. 6 illustrates process 600 of a second exemplary embodiment in accordance with this invention. In process 600, the IPv6 software that manages the neighboring nodes table management database writes sources address of neighboring nodes of interest into a reachablity table. Process 600 reads received packets to determine whether the packets indicate reachablity of the neighboring node.

Process 600 begins in step 605 by receiving a packet. In step 610, process 600 reads the source address from the received packet. The interest table is then read to determine whether the source address is included in the interest table. As stated above, one skilled in the art will recognize that the interest table may be a table, database or any other kind of data structure stored in a memory to store source address of neighboring nodes for which a node has an interest in determining the reachablity of the node.

In step 615 and 625, it is determined whether the source address is in the interest table. If the source address is in the interest table, process 600 updates the entry in the interest table for the source address with reachablity information for the neighboring node of the source address in step 625. The reachablity information may include but is not limited to the source address, destination address, source port, acknowledgement, and sequence number of the packet.

After the information is updated, process 600 determines whether the interest table is full or uses some other manner such as timing or number of packets reviewed in step 630. If the interest table is full, process 600 generates an interrupt for the IPv6 software in step 635. Otherwise process 600 ends.

Figure 7:
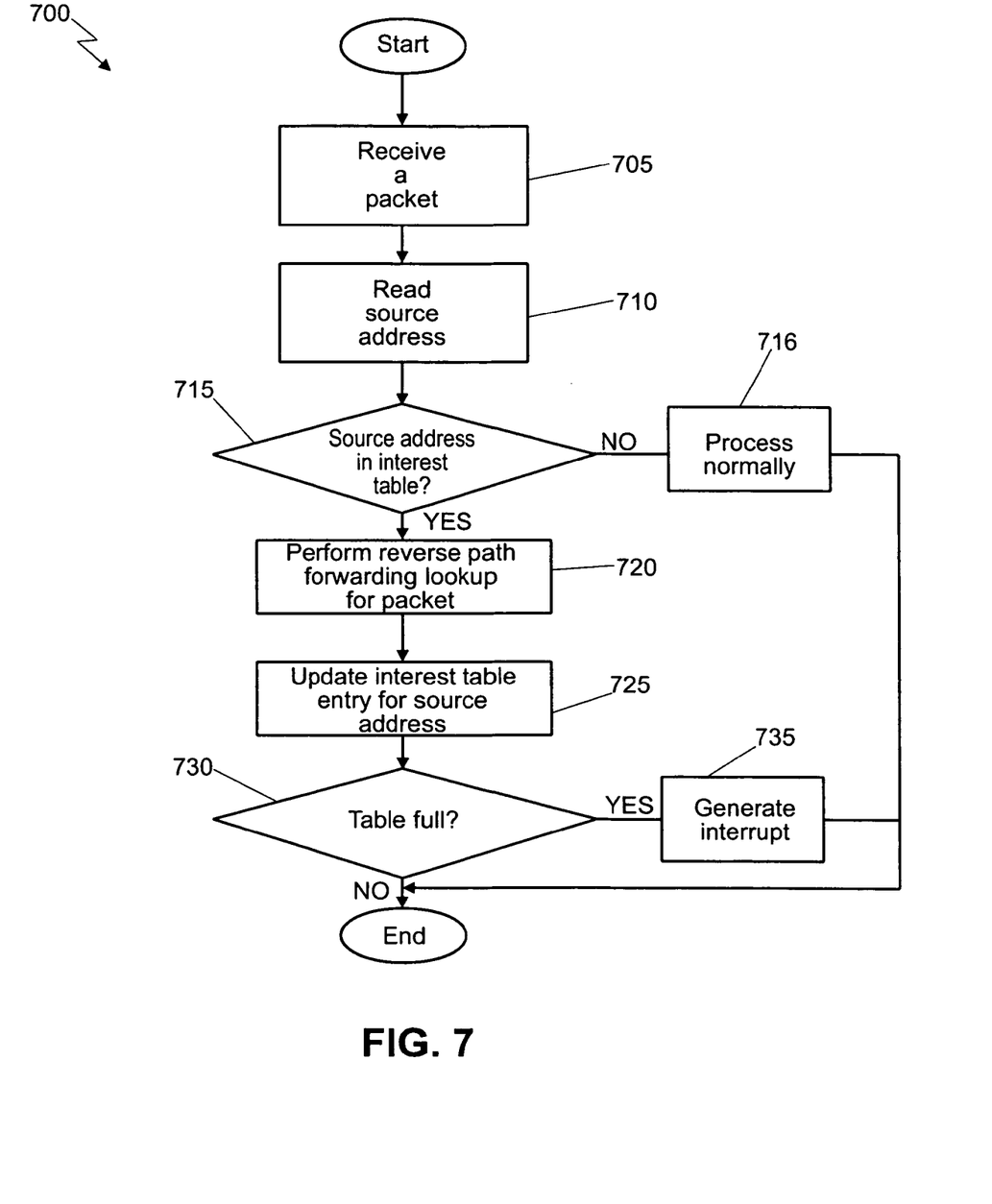
FIG. 7 illustrating a flow diagram of a third exemplary embodiment for determining reachablity of a neighboring node in accordance with this invention.

FIG. 7 illustrates process 700 provides a process for a third exemplary embodiment in accordance with this invention. In process 700, the source addresses of neighboring nodes of interest are stored in an interest table or other data structure for storing a list of addresses. When a packet is received from one of the addresses, a reverse path forward lookup is performed to determine reachablity information.

Process 700 begins in step 705 by receiving a packet. In step 710, process 700 reads the source address from the packet. Step 715 determines whether the source address is included in the interest table. If the source address is not in the interest table, process 700 allows the packet to be processed normally in step 716.

If the source address is in the interest table, process 700 performs a reverse path forward lookup for the packet in step 720 to obtain reachablity information for the neighboring node. The reachablity information is then stored in the entry in the interest table for the source address in step 725.

After the information is updated, process 700 determines whether the interest table is full or uses some other manner such as timing or number of packets reviewed in step 730. If the interest table is full, process 700 generates an interrupt for the IPv6 software in step 735. The IPv6 software then may use the information to update the neighbor management database. Otherwise, process 700 ends.

Figure 8:
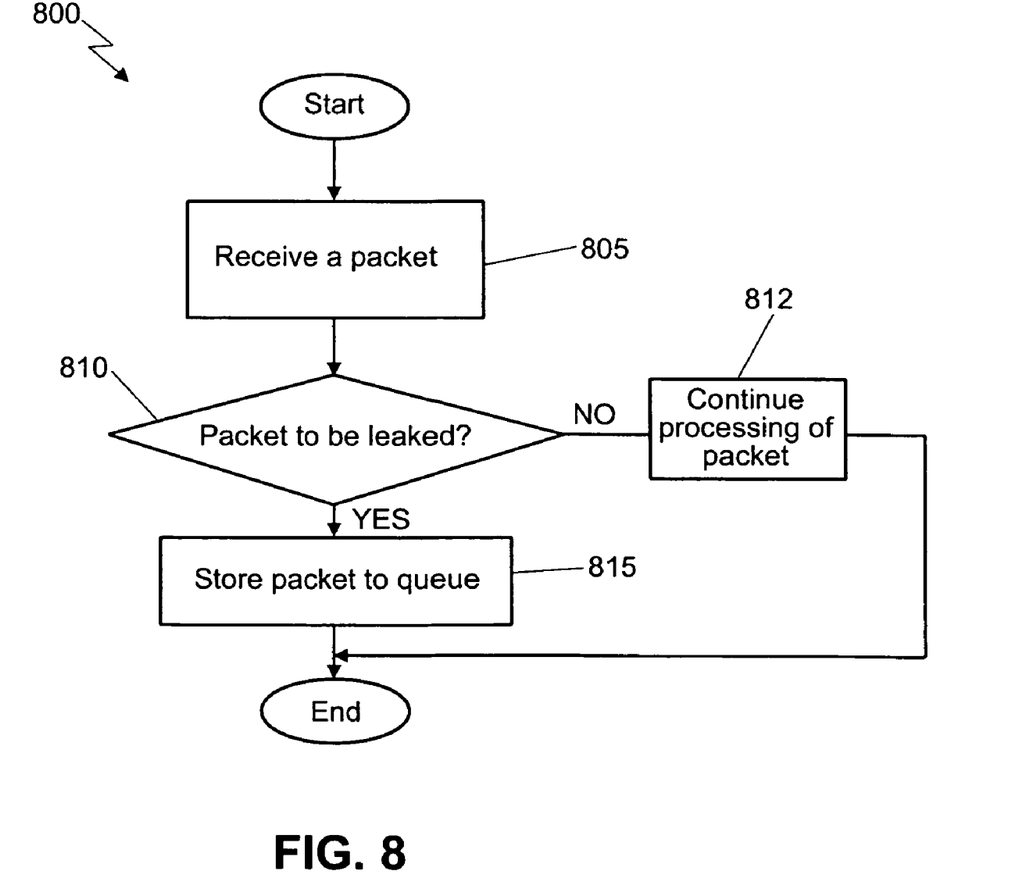
FIG. 8 illustrating a flow diagram of a process for a software application to read an interest table to retrieve reachablity information in accordance with this invention.
Figure 9:
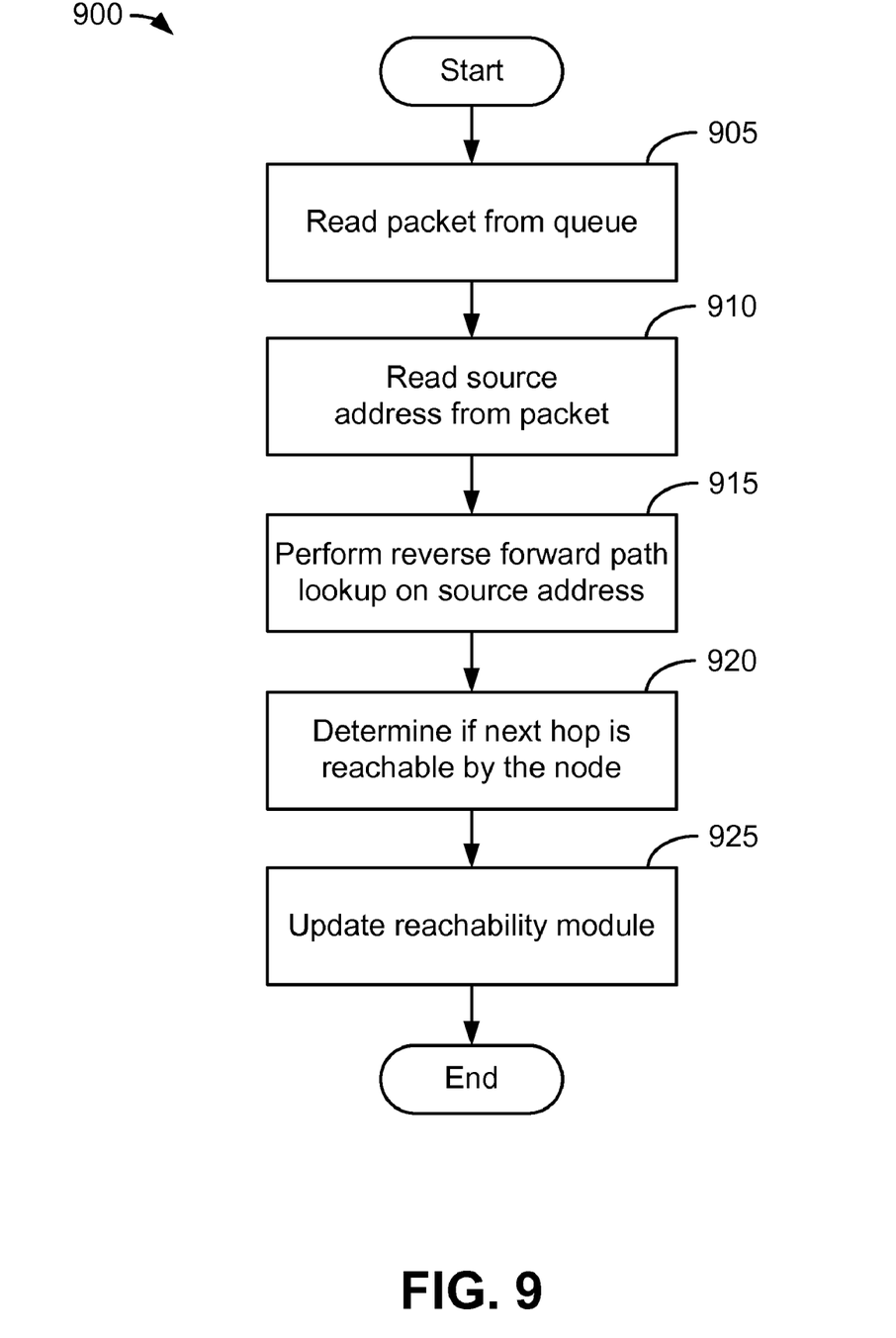
FIG. 9 illustrating a flow diagram of a process for storing packets in a queue in accordance with a fourth exemplary embodiment of this invention.

In a fourth exemplary embodiment, random received packets are written to a queue or other buffer for storage. A processing unit then executes an application that determines reachablity information for a source address and stores the information for updating of reachablity information by the IPv6 software. FIGS. 8 and 9 illustrate processes for providing the fourth exemplary embodiment in accordance with this invention.

Process 800 in FIG. 8 begins at step 805 by receiving a packet. In step 810, process 800 determines whether the packet must be written to the queue or buffer. The determination may be made by storing every Nth packet received, or time stamp, type message or some other manner. If the packet is not to be stored, process 800 allows the packet to be processed normally in step 812. Otherwise, the packet is stored to the queue or buffer in 815 and process 800 ends.

Figure 10:
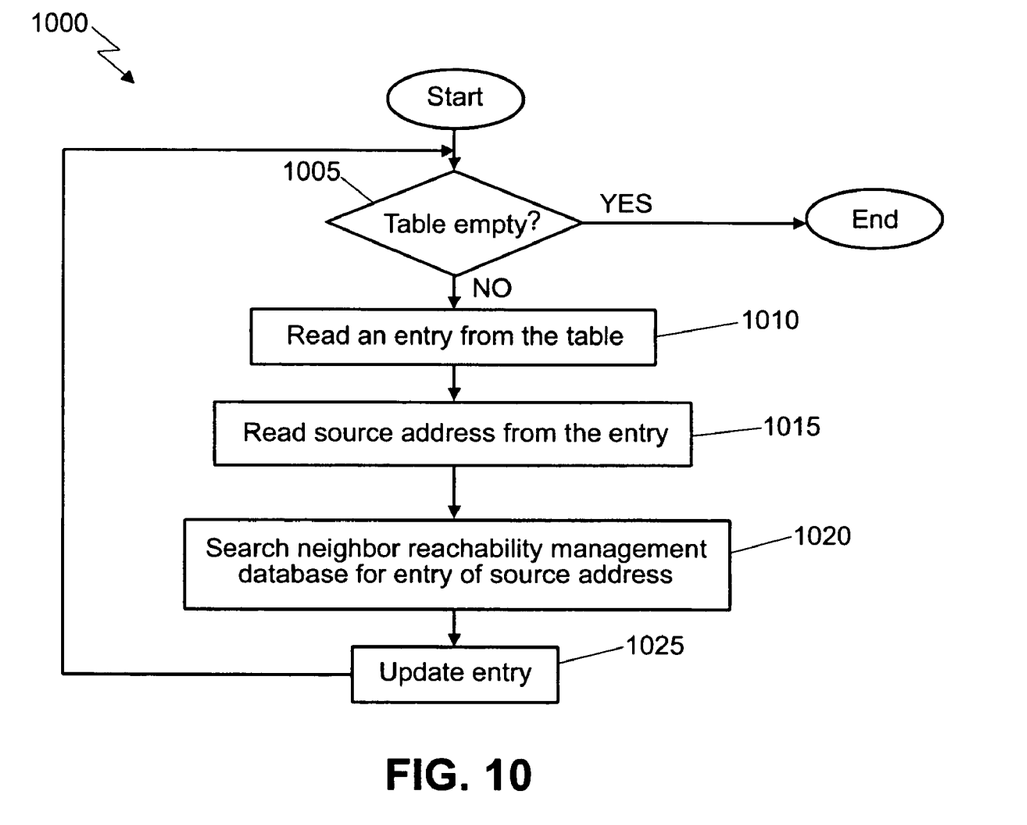
FIG. 10 illustrating a flow diagram of a fourth exemplary embodiment for determining reachablity of a neighboring node in accordance with this invention.

FIG. 9 illustrates a process 900 executed by a processing unit to determine reachablity information from the packets. Process 900 begins in step 905 by reading a packet from the queue or buffer. In step 910, the source address of the packet is read. A reverse path forward lookup is then performed in step 915. From the information from the reverse path forward lookup, process 900 determines whether a next hop is reachable by the node in step 920. Process 900 then updates a neighboring nodes table management database for the IPv6 software with reachablity information for the node of the next hop in step 925. Process 900 then ends. FIG. 100 illustrates a process 1000 performed by IPv6 to update a neighboring nodes table management database for the IPv6 software from the interest tables in the various embodiment of this invention. Process 1000, begins by determining whether an interest table is empty in step 1005. If the table is empty, process 1000 ends. If the table is not empty, process 1000 reads an entry for the table in step 1010. The source address of the entry is then read in step 1015. The entry for the source address in the neighboring nodes table management database is then found in step 1020. The entry in the neighboring nodes table management database is then updated with the reachablity information from the entry in step 1025 and process 1000 returns to step 1005.

The above is a description of this invention and four exemplary embodiments of this invention. It is expected that those skilled in the art can and will design an alternative system that infringes this invention as set forth in the claims below either literally, or through the Doctrine of Equivalents.

What is claimed is:

1. A system for determining reachability of a neighboring node from a node in a network, comprising:

circuitry configured to receive a packet having a destination address for a node other than said node;

circuitry configured to read a source address from said packet responsive to receiving said packet;

circuitry configured to determine whether said source address is for a neighboring node for which said node needs to determine reachability;

circuitry configured to make a reachability determination for said neighboring node according to whether said packet indicates a forward link from said node to said neighboring node, with said reachability determination based on one or more of a destination address for the packet, a source port for the packet, a destination port for the packet, an acknowledgement number, or sequence numbers from the packet, wherein the node sends fewer solicitation and response messages over the network as a result of the reachability determination; and circuitry configured to store reachability information for said neighboring node responsive to a determination of said forward link.

2. The system of claim 1 wherein said circuitry configured to determine whether said packet indicates a forward link comprises:

circuitry configured to determine whether said packet includes an advertisement.

3. The system of claim 2 wherein said circuitry configured to determine whether said packet indicates a forward link further comprises:
circuitry configured to read a solicitation bit from said packet responsive to a determination that said packet includes said advertisement; and circuitry configured to determine whether said solicitation bit is set.

4. The system of claim 3 wherein said circuitry configured to store said reachability information comprises:
circuitry configured to add said source address of said packet to said neighbor cache in a memory.

5. The system of claim 4 wherein said circuitry configured to store said reachability information further comprise:
circuitry configured to determine whether said source address is stored in said neighbor cache wherein said source address is added to said neighbor cache responsive to a determination that said source address is not contained in said neighbor cache.

6. The system of claim 4 further comprising:
circuitry configured to determine whether said neighbor cache is full; and circuitry configured to generate an interrupt for a software application responsive to a determination that said neighbor cache is full.

7. The system of claim 1 wherein said circuitry configured to determine whether said source address for a neighboring node comprises:
circuitry configured to determine whether said source address is included in an interest table.

8. The system of claim 7 wherein said circuitry configured to store said reachability information further comprises:
circuitry configured to read a destination address from said packet; and circuitry configured to said store said destination address in an entry in said interest table for said source address.

9. The system of claim 7 wherein said circuitry configured to store said reachability information further comprises:
circuitry configured to determine a source port from said packet; and
circuitry configured to said store said source port in an entry in said interest table for said source address.

10. The system of claim 7 wherein said circuitry configured to store said reachability information further comprises:
circuitry configured to determine a destination port for said packet; and circuitry configured to said store said destination port in an entry in said interest table for said source address.

11. The system of claim 7 wherein said circuitry configured to store said reachability information further comprises:
circuitry configured to read an acknowledgement for said packet; and
circuitry configured to said store said acknowledgement in an entry in said interest table for said source address.

12. The system of claim 7 wherein said circuitry configured to store said reachability information further comprises:
circuitry configured to read sequence numbers from said packet; and circuitry configured to store said sequence numbers in an entry in said interest table for said source address.

13. The system of claim 7 wherein said circuitry configured to store said reachability information further comprises:
circuitry configured to determine whether said interest table is full; and circuitry configured to generate an interrupt for a software application responsive to a determination that said interest table is full.

14. The system of claim 13 further comprising:
computer executable instructions of said software application for directing a processing unit to:
read said reachability information for an entry, and
store said reachability information in a neighbor reachability database; and a media readable by said processing unit for storing said instructions.

15. The system of claim 14 wherein said instructions comprise:
instructions for directing said processing unit to:
determine whether said interest table includes at least one entry,
read a subsequent entry responsive to a determination that said interest table includes at least one entry, and
store said reachability information from said entry in said neighbor reachability database.

16. The system of claim 7 further comprising:
circuitry configured to determine reachability information for said neighboring node having an address that is stale; and
circuitry configured to insert said address into said interest table responsive to a determination that said reachability information for said neighboring node is stale.

17. The system of claim 7 wherein said circuitry configured to determine whether said source address is for a neighboring node comprises:
circuitry configured to perform a reverse path forwarding lookup for said packet responsive to a determination that said source address is in said interest table.

18. The system of claim 17 wherein said circuitry configured to store said reachability information comprises:
circuitry configured to update an entry for said source address in said interest table with data returned from said reverse path forwarding lookup.

19. The system of claim 1 further comprising:
circuitry configured to write said packet to a queue.

20. The system of claim 19 wherein said circuitry configured to determine whether said packet indicates a forward link comprises:
circuitry configured to read said packet from said queue;
circuitry configured to read a source address from said packet;
circuitry configured to perform a reverse path lookup for said packet responsive to reading said source address; and
circuitry configured to update a reachability module with information received from said performing of said reverse forward path lookup.

21. A method for determining reachability of a neighboring node from a node in a network, comprising:
receiving a packet over said network wherein said packet has a destination address of a node other than said node;
reading a source address from said packet responsive to receiving said packet;
determining whether said source address is for a neighboring node for which said node needs to determine reachability, the determining performed according to whether said source address is included in an interest table storing addresses of neighboring nodes for which the node requires reachability information;
making a reachability determination for said neighboring node according to whether said packet indicates a forward link from said node to said neighboring node, with said reachability determination based on one or more of a destination address from the packet, a source port for the packet, a destination port for the packet, an acknowledgement number, or sequence numbers from the packet; and storing reachability information for said neighboring node in a memory responsive to a determination of said forward link wherein the node sends fewer solicitation and response messages over the network at a result of the reachability determination.

22. The method of claim 21 wherein said step for determining whether said packet indicates a forward link comprises:

determining whether said packet includes an advertisement.

23. The method of claim 22 wherein said step of determining whether said packet indicates a forward link further comprises:

reading a solicitation bit from said packet responsive to a determination that said packet includes said advertisement; and determining whether said solicitation bit is set.

24. The method of claim 23 wherein said step of storing said reachability information comprises:

adding said source address of said packet to said neighbor cache in a memory.

25. The method of claim 24 wherein said step of storing said reachability information further comprise:

determining whether said source address is stored in said neighbor cache wherein said source address is added to said neighbor cache responsive to a determination that said source address is not contained in said neighbor cache.

26. The method of claim 24 further comprising:

determining whether said neighbor cache is full; and generating an interrupt for a software application responsive to a determination that said neighbor cache is full.

27. The method of claim 21 wherein said step of storing said reachability information further comprises:

reading a destination address from said packet; and storing said destination address in an entry in said interest table for said source address.

28. The method of claim 21 wherein said step of storing said reachability information further comprises:

determining a source port from said packet; and storing said source port in an entry in said interest table for said source address.

29. The method of claim 21 wherein said step of storing said reachability information further comprises:

determining a destination port for said packet; and storing said destination port in an entry in said interest table for said source address.

30. The method of claim 21 wherein said step of storing said reachability information further comprises:

determining an acknowledgement for said packet; and storing said acknowledgement in an entry in said interest table for said source address.

31. The method of claim 21 wherein said step of storing said reachability information further comprises:

reading sequence numbers from said packet; and storing said sequence numbers in an entry in said interest table for said source address.

32. The method of claim 21 wherein said step of storing said reachability information further comprises:

determining whether said interest table is full; and generating an interrupt for a software application responsive to a determination that said interest table is full.

33. The method of claim 32 further comprising:

reading said reachability information from an entry of said interest table; and storing said reachability information in a neighbor reachability database.

34. The method of claim 33 further comprising:

determining whether said interest table includes at least one entry;

reading a subsequent entry responsive to a determination that said interest table includes at least one entry; and storing said reachability information from said entry in said neighbor reachability database.

35. The method of claim 21 further comprising:

determining reachability information for said neighboring node having an address that is stale; and inserting said address into said interest table responsive to a determination that said reachability information for said neighboring node is stale.

36. The method of claim 21 wherein said step of determining whether said source address is for a neighboring node comprises:

performing a reverse path forwarding lookup for said packet responsive to a determination that said source address is in said interest table.

37. The method of claim 21 wherein said step of storing said reachability information comprises:

updating an entry for said source address in said interest table with data returned from said reverse path forwarding lookup.

38. The method of claim 21 further comprising:

writing said packet to a queue.

39. The method of claim 38 wherein said determining whether said packet indicates a forward link comprises:

reading said packet from said queue;

reading a source address from said packet;

performing a reverse path lookup for said packet responsive to reading said source address; and updating a reachability module with information received from said performing of said reverse forward path lookup.

40. A computer readable medium carrying one or more sequences of one or more instructions for determining reachability of a neighboring node from a node in a network, the one or more sequences of instructions including instructions which, when executed by one or more processors, cause one or more processors to perform a method comprising:

receiving a packet transmitted over said network wherein said packet has a destination address of a node other said node;

reading a source address from said packet responsive to receiving said packet;

determining whether said source address is for a neighboring node for which said node needs to determine reachability, the determining performed according to whether said source address is included in an interest table storing addresses of neighboring nodes for which the node requires reachability information;

making a reachability determination for said neighboring node according to whether said packet indicates a forward link from said node to said neighboring node, with said reachability determination based on one or more of a destination address from the packet, a source port for the packet, a destination port for the packet, an acknowledgement number, or sequence numbers from the packet; and storing reachability information for said neighboring node responsive to a determination of said forward link wherein the node sends fewer solicitation and response messages over the network at a result of the reachability determination.

41. The computer readable medium of claim 40 wherein said step of determining whether said packet indicates a forward link in said method comprises:
   determining whether said packet includes an advertisement.

42. The computer readable medium of claim 41 wherein said step of determining whether said packet indicates a forward link further in said method comprises:
   reading a solicitation bit from said packet responsive to a determination that said packet includes said advertisement, and determining whether said solicitation bit is set.

43. The computer readable medium of claim 42 wherein said step of storing said reachability information in said method comprises:
   adding said source address of said packet to said neighbor cache in a memory.

44. The computer readable medium of claim 43 wherein said step of storing said reachability information in said method further comprises:
   determining whether said source address is stored in said neighbor cache wherein said source address is added to said neighbor cache responsive to a determination that said source address is not contained in said neighbor cache.

45. The computer readable medium of claim 43 wherein said method further comprises:
   determining whether said neighbor cache is full; and
   generating an interrupt for a software application responsive to a determination that said neighbor cache is full.

46. The computer readable medium of claim 40 wherein said step of storing said reachability information in said method comprises:
   reading a destination address from said packet, and
   storing said destination address in an entry in said interest table for said source address.

47. The computer readable medium of claim 40 wherein said step of storing said reachability information in said method further comprises:
   determining a source port from said packet, and
   storing said source port in an entry in said interest table for said source address.

48. The computer readable medium of claim 40 wherein said step of storing said reachability information in said method further comprises:
   determining a destination port for said packet; and
   storing said destination port in an entry in said interest table for said source address.

49. The computer readable medium of claim 40 wherein said step of storing said reachability information in said method further comprises:
   determining an acknowledgement for said packet; and
   storing said acknowledgement in an entry in said interest table for said source address.

50. The computer readable medium of claim 40 wherein said step of storing said reachability information in said method further comprises:
   reading sequence numbers from said packet; and
   storing said sequence numbers in an entry in said interest table for said source address.

51. The computer readable medium of claim 40 wherein said step of storing said reachability information in said method further comprises:
   determining whether said interest table is full; and
   generating an interrupt for a software application responsive to a determination that said interest table is full.

52. The computer readable medium of claim 51 wherein said method further comprises:
   reading said reachability information for an entry; and
   storing said reachability information in a neighbor reachability database.

53. The computer readable medium of claim 52 wherein said method further comprises:
   determining whether said interest table includes at least one entry;
   reading a subsequent entry responsive to a determination that said interest table includes at least one entry, and storing said reachability information from said entry in said neighbor reachability database.

54. The computer readable medium of claim 40 wherein said method further comprises:
   determining reachability information for said neighboring node having an address that is stale; and
   inserting said address into said interest table responsive to a determination that said reachability information for said neighboring node is stale.

55. The computer readable medium of claim 40 wherein said step of determining whether said source address is of a neighboring node in said method comprises:
   performing a reverse path forwarding lookup for said packet responsive to a determination that said source address is in said interest table.

56. The computer readable medium of claim 40 wherein said step of storing said reachability information in said method comprises:
   updating an entry for said source address in said interest table with data returned from said reverse path forwarding lookup.

57. The computer readable medium of claim 40 wherein said method further comprises:
   writing said packet to a queue.

58. The computer readable medium of claim 57 wherein said step of determining whether said packet indicates a forward link in said method comprises:
   reading said packet from said queue;
   reading a source address from said packet;
   performing a reverse path lookup for said packet responsive to reading said source address; and
   updating a reachability module with information received from said performing of said reverse forward path lookup.

59. An apparatus for determining reachability of a neighboring node from a node in a network, comprising:
   means for receiving a packet over said network wherein said packet has a destination address of a node other than said node;
   means for reading a source address from said packet responsive to receiving said packet;
   means for determining whether said source address is for a neighboring node for which said node needs to determine reachability, wherein said neighboring node comprises a switch, a desktop computer system, a laptop computer, a workstation, or a server computer;
   means for making a reachability determination for said neighboring node according to whether said packet indicates a forward link from said node to said neighboring node, with said reachability determination based solely on information in said packet, wherein the node sends fewer solicitation and response messages over the network as a result of the reachability determination; and means for storing reachability information for said neighboring node in a memory responsive to a determination of said forward link.

60. The apparatus of claim 59 wherein said means for determining whether said packet indicates a forward link comprises:
means for determining whether said packet includes an advertisement.

61. The apparatus of claim 60 wherein said means for determining whether said packet indicates a forward link further comprises:
means for reading a solicitation bit from said packet responsive to a determination that said packet includes said advertisement; and
means for determining whether said solicitation bit is set.

62. The apparatus of claim 61 wherein said means for storing said reachability information comprises:
means for adding said source address of said packet to said neighbor cache in a memory.

63. The apparatus of claim 62 wherein said means for storing said reachability information further comprise:
means for determining whether said source address is stored in said neighbor cache wherein said source address is added to said neighbor cache responsive to a determination that said source address is not contained in said neighbor cache.

64. The apparatus of claim 62 further comprising:
means for determining whether said neighbor cache is full; and
means for generating an interrupt for a software application responsive to a determination that said neighbor cache is full.

65. The apparatus of claim 59 wherein said means for determining whether said source address is for a neighboring node comprises:
means for determining whether said source address is included in an interest table.

66. The apparatus of claim 65 wherein said means for storing said reachability information further comprises:
means for reading a destination address from said packet; and
means for storing said destination address in an entry in said interest table for said source address.

67. The apparatus of claim 65 wherein said means for storing said reachability information further comprises:
means for determining a source port from said packet; and
means for storing said source port in an entry in said interest table for said source address.

68. The apparatus of claim 65 wherein said means for storing said reachability information further comprises:
means for determining a destination port for said packet; and
means for storing said destination port in an entry in said interest table for said source address.

69. The apparatus of claim 65 wherein said means for storing said reachability information further comprises:

means for determining an acknowledgement for said packet; and
means for storing said acknowledgement in an entry in said interest table for said source address.

70. The apparatus of claim 65 wherein said means for storing said reachability information further comprises:
means for reading sequence numbers from said packet; and
means for storing said sequence numbers in an entry in said interest table for said source address.

71. The apparatus of claim 65 wherein said means for storing said reachability information further comprises:
means for determining whether said interest table is full; and
means for generating an interrupt for a software application responsive to a determination that said interest table is full.

72. The apparatus of claim 71 further comprising:
means for reading said reachability information from an entry of said interest table; and
means for storing said reachability information in a neighbor reachability database.

73. The apparatus of claim 72 further comprising:
means for determining whether said interest table includes at least one entry; means for reading a subsequent entry responsive to a determination that said interest table includes at least one entry; and
means for storing said reachability information from said entry in said neighbor reachability database.

74. The apparatus of claim 65 further comprising:
means for determining reachability information for said neighboring node having an address that is stale; and
means for inserting said address into said interest table responsive to a determination that said reachability information for said neighboring node is stale.

75. The apparatus of claim 65 wherein said means for determining whether said source address is for a neighboring node comprises:
means for performing a reverse path forwarding lookup for said packet responsive to a determination that said source address is in said interest table.

76. The apparatus of claim 65 wherein said means for storing said reachability information comprises:
means for updating an entry for said source address in said interest table with data returned from said reverse path forwarding lookup.

77. The apparatus of claim 59 further comprising: means for writing said packet to a queue.

78. The apparatus of claim 77 wherein said means for determining whether said packet indicates a forward link comprises: means for reading said packet from said queue;
means for reading a source address from said packet;
means for performing a reverse path lookup for said packet responsive to reading said source address; and
means for updating a reachability module with information received from said performing of said reverse forward path lookup.

* * * * *